(12) United States Patent
Gong et al.

(10) Patent No.: US 11,658,951 B2
(45) Date of Patent: May 23, 2023

(54) CARRIER ENCRYPTION SYSTEM

(71) Applicant: PAYPAL, INC., San Jose, CA (US)

(72) Inventors: Alex Gong, San Jose, CA (US); Everett Quebral, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 242 days.

(21) Appl. No.: 16/940,001

(22) Filed: Jul. 27, 2020

(65) Prior Publication Data

US 2021/0051138 A1 Feb. 18, 2021

Related U.S. Application Data

(63) Continuation of application No. 15/857,939, filed on Dec. 29, 2017, now Pat. No. 10,728,228.

(51) Int. Cl.
| | |
|---|---|
| *H04L 9/14* | (2006.01) |
| *H04L 9/12* | (2006.01) |
| *H04L 9/40* | (2022.01) |
| *G06Q 20/38* | (2012.01) |
| *H04W 12/06* | (2021.01) |
| *H04L 9/32* | (2006.01) |
| *G06Q 20/32* | (2012.01) |

(52) U.S. Cl.
CPC ..... *H04L 63/0442* (2013.01); *G06Q 20/3829* (2013.01); *H04L 63/0428* (2013.01); *H04L 63/06* (2013.01); *H04L 63/08* (2013.01); *H04W 12/06* (2013.01); *G06Q 20/3265* (2020.05)

(58) Field of Classification Search
None
See application file for complete search history.

(56) References Cited

U.S. PATENT DOCUMENTS

| 8,010,640 B2 | 8/2011 | Aune et al. | |
|---|---|---|---|
| 8,443,420 B2 * | 5/2013 | Brown | H04W 4/24 |
| | | | 455/406 |
| 9,906,366 B1 * | 2/2018 | Maria | H04L 9/065 |
| 10,728,228 B2 | 7/2020 | Gong et al. | |

(Continued)

OTHER PUBLICATIONS

Building Secure User-to-user Messaging in Mobile Telecommunication Networks. Zhao. IEEE. (Year: 2008).*

(Continued)

*Primary Examiner* — Venkat Perungavoor
(74) *Attorney, Agent, or Firm* — Haynes and Boone, LLP

(57) ABSTRACT

Carrier secure communications are provided by receiving, by a service provider device from an application interacting with a user device over a carrier network, an encrypted first request for user information. The carrier network intercepted a first request from the application based on a service provider identifier in the first request, and encrypted the first request to provide the network carrier encrypted first request to the service provider device. The service provider device may decrypt the encrypted first request to provide the first request and process the first request. The first request may include a carrier injected header that includes information about the user and/or user device that provided the first request. The information in the injected header may be used by the service provider device in processing the first request such as retrieving secure information without user credentials or storing data provided in the first request.

20 Claims, 10 Drawing Sheets

(56) References Cited

U.S. PATENT DOCUMENTS

| | | | |
|---|---|---|---|
| 2006/0206709 A1* | 9/2006 | Labrou | G06Q 20/18 |
| | | | 713/167 |
| 2007/0150953 A1 | 6/2007 | Hamid et al. | |
| 2009/0323953 A1 | 12/2009 | Narayan et al. | |
| 2010/0265034 A1 | 10/2010 | Cap et al. | |
| 2010/0274726 A1 | 10/2010 | Florek et al. | |
| 2011/0030039 A1* | 2/2011 | Bilange | H04L 63/18 |
| | | | 726/5 |
| 2012/0058775 A1 | 3/2012 | Dupray et al. | |
| 2013/0285855 A1 | 10/2013 | Dupray et al. | |
| 2014/0067930 A1* | 3/2014 | Berdichevsky | H04W 4/06 |
| | | | 709/204 |
| 2014/0259122 A1 | 9/2014 | Ganesan | |
| 2016/0127902 A1* | 5/2016 | Ciarniello | G06F 21/43 |
| | | | 380/247 |
| 2017/0063924 A1 | 3/2017 | Dick et al. | |
| 2017/0171200 A1* | 6/2017 | Bao | H04W 12/069 |
| 2017/0213213 A1* | 7/2017 | Tomlinson, Jr. | G06Q 20/3227 |
| 2018/0183608 A1 | 6/2018 | Koyun et al. | |
| 2019/0140844 A1 | 5/2019 | Brown et al. | |
| 2019/0312878 A1 | 10/2019 | Brown et al. | |
| 2021/0250363 A1* | 8/2021 | Schmidt | H04L 67/306 |

OTHER PUBLICATIONS

Porscha: Policy Oriented Secure Content Handling in Android. Ongtang. ACM. (Year: 2010).*

Configuration Differences for Web Services Security Policy on Heterogeneous Platforms. Ji. (Year: 2011).*

Web Security Attacks and Injection—A Survey. Patil. IJOART. (Year: 2015).*

* cited by examiner

```
{
    "decrypted_msisdn": {
        "country_code": "+55",
        "national_number": "9123456789"
    },
    "links": [
        {
            "href": "http://localhost:6161/v1/identity/external-providers/decrypt-msisdn",
            "ref": "self",
            "method": "POST",
            "encType": "application/json"
        }
    ]
}
```

CARRIER ENCRYPTION SYSTEM

CROSS REFERENCE TO RELATED APPLICATIONS

The present application is a continuation of and claims priority to U.S. patent application Ser. No. 15/857,939, filed Dec. 29, 2017, which is incorporated herein in its entirety.

BACKGROUND

The present disclosure generally relates to data encryption, and more specifically, securely providing electronic data through carrier encryption in network communications.

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Users of payment service providers, on-line merchants, and other on-line service providers may access respective user accounts via their mobile devices and request secure information that is only accessible when the user of the mobile device is verified by a security feature such as manually typing in user credentials. However, requesting a user to provide information through manual data entry is arduous, especially on mobile devices. Some applications (e.g., PayPal's One Touch™) provide secure user information to the user using credentials the user has already provided to access the mobile device, thereby reducing the number of times a user has to login to perform payment processing or access certain secure data. As these applications become more popular, however, they also become more lucrative targets for hackers. These processes, along with other traditional authentication techniques, are not indomitable, especially as hackers become more sophisticated. These types of security compromises may result in monetary loss to consumers and/or merchants, as well as exposure of sensitive personal and financial information.

BRIEF DESCRIPTION OF THE FIGURES

FIG. 6 is a block of code illustrating an example of a response to the encrypted request of FIG. 5;

Figure 1:
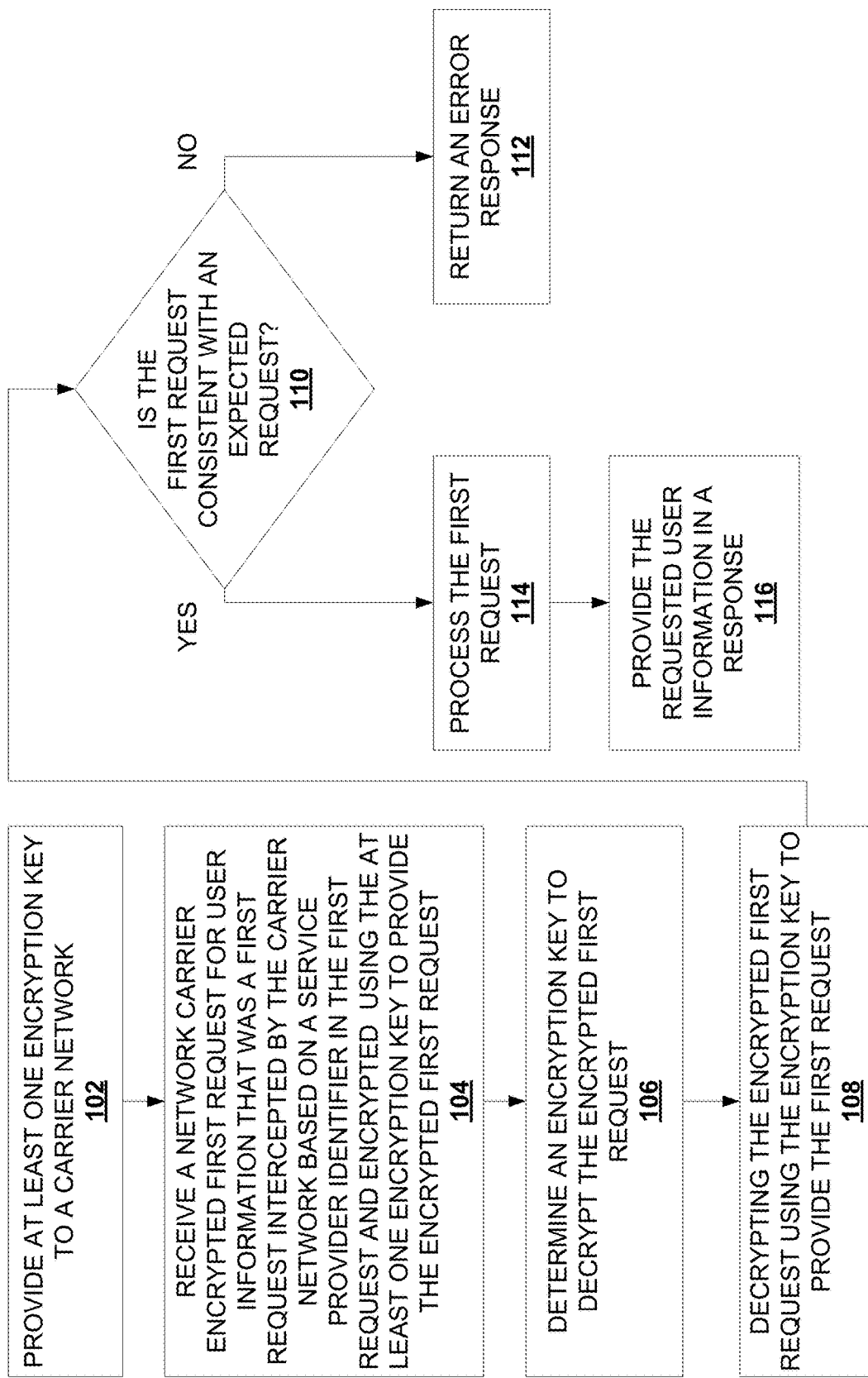
FIG. 1 is a flow chart illustrating an embodiment of a method for carrier encryption.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure include systems and methods for providing a carrier encryption system. Often times, service providers request user information from a user for one or more services, such as for creating an account and/or authorizing the user for a service. However, this information is usually manually provided by the user, which results in the user providing the same information manually over and over again. By using carrier injected headers, user information can be shared without the user having to manually enter the information. Instead, carriers (e.g., telecommunications/internet service provider companies that provide the network communication service to the user device) can provide the information on behalf of the user. This system is particularly advantageous over other forms of user information sharing because carriers and user computing devices associated with the carriers can provide other information about a user and/or user device without the user's input. This other information can be used to determine the risk of sharing user information and assess whether there is an unacceptable level of risk for sharing user information. There is an additional level of security when a system can determine that the user information that is being shared is being conducted on a user device associated with the user which is on a carrier network associated with the user, and that the subscription to the carrier network is also associated with the user. For example, mobile phones are a very personal device with several levels of security. Thus, a system can predict with some level of confidence that the user of the user device is the same person that is the subscriber of the mobile phone services with a carrier. Additionally, the user of a mobile phone, with use over time, establishes a digital fingerprint or profile of the user and the system can use that digital fingerprint to determine that the user of the user device is the same as the subscriber of the mobile phone services. In some examples, the digital fingerprint may be phone use history, GPS location, and/or other information about the user device and use of the user device.

Furthermore, subverting or spoofing carrier injected headers is difficult because it is controlled by the carrier network. Therefore, carrier injected headers are a particularly secure technique for sharing user information and can be used to determine security risks. However, spoofing of a carrier injected header in a request for information and/or other malformed requests for user information may still occur. Therefore, as discussed below, the systems and methods of the present disclosure provide additional security by providing a carrier encryption system where a carrier device intercepts a request from a user device to a service provider device based on a service provider identifier in the request and encrypts at least a portion of the request. The carrier device may encrypt the request, from the user device, using one or more encryption keys provided to the carrier by the service provider. In one example, the carrier device may encrypt at least a portion of the injected header such as the mobile station international subscriber directory number (MSISDN), which is a mapping of the telephone number of the subscriber of the carrier service and that subscriber's SIM card in a mobile cellular phone. The service provider device may then receive the encrypted request, determine that the request is encrypted, determine which encryption key to use based on unencrypted information in the request, and decrypt the encrypted request to provide the unencrypted request. The unencrypted request may be a request for the secure information that requires user authentication before the secure information is provided to the user or the request may be to store data that requires user authentication at the service provider device. Being able to decrypt the encrypted request may provide a sufficient level of confidence to the service provider that the user information in the request used for authentication is being provided by the carrier, and thus the user information that the carrier and/or user device is providing is that of the user requesting the secure information. For example, the MSISDN indicates a user making the request. Thus, the service provider device may then process the unencrypted request and provide the information being requested to the user device if that user associated with the MSISDN is the user associated with the information being requested.

Referring now to FIGS. 1, 2, 3, and 4, a method 100 for providing carrier encryption is illustrated. In some embodiments of the method 100 described below, one or more service provider devices and carrier devices may operate to perform the method 100. For example, a carrier device may operate to intercept requests from a user device to a service provider device, encrypt the request and/or encrypt at least a portion of a carrier header injected into the request to provide an encrypted request, forward that encrypted request to a service provider device, and perform the method 100 as detailed below. In another embodiment, one or more service provider devices may perform the method 100 separate from the carrier device. For example, a payment service provider such as, for example, PayPal, Inc. of San Jose, Calif., may utilize a payment service provider device to perform the method 100 discussed below, and in some embodiments may operate in cooperation with one or more other system providers (via their system provider devices) and/or payees (via their user devices) to perform the method 100 discussed below. However, these embodiments are meant to be merely examples, and one of skill in the art in possession of the present disclosure will recognize that a wide variety of service providers, carriers, and users may operate, alone or together, to provide the systems and methods discussed herein without departing from the scope of the present disclosure.

Figure 2:
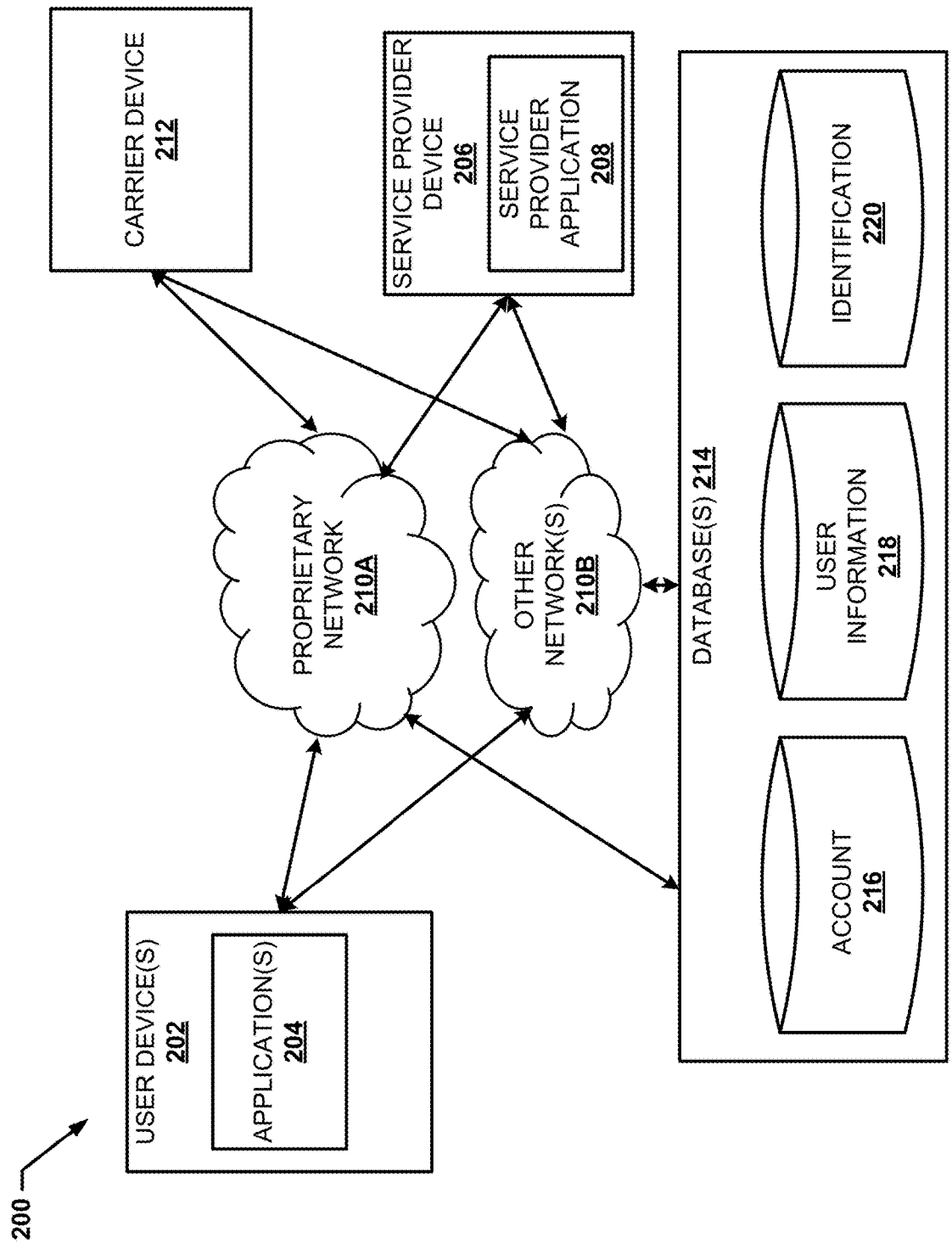
FIG. 2 is a schematic view illustrating an embodiment of a carrier encryption system.

Referring now to FIG. 2, an embodiment of a carrier encryption system 200 is illustrated. As shown, the carrier encryption system 200 may include or implement a plurality of servers, devices, and/or software components that operate to perform various methodologies in accordance with the described embodiments. Exemplary servers may include, for example, stand-alone and enterprise-class servers operating a server operating system (OS) such as a MICROSOFT® OS, a UNIX® OS, a LINUX® OS, a StarOS® or other suitable server-based OS. It may be appreciated that the servers illustrated in FIG. 2 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

The carrier encryption system 200 may include, among various devices, servers, databases and other elements, one or more user devices 202, such as a laptop, a mobile computing device, a tablet, a PC, a wearable device, and/or any other computing device having computing and/or communications capabilities in accordance with the described embodiments. The user devices 202 may include a cellular telephone, smart phone, or other similar mobile computing devices that a user may carry on or about his or her person and access content through network or carrier communication services.

The user devices 202 may include one or more applications 204. Example applications may include, without limitation, a web browser application, messaging applications (e.g., e-mail, IM, SMS, MMS, telephone, voicemail, VoIP, video messaging, internet relay chat (IRC)), a contacts application, a calendar application, an electronic document application, a database application, a media application (e.g., music, video, television), a payment application, a social media application, a location-based services (LBS) application (e.g., GPS, mapping, directions, positioning systems, geolocation, point-of-interest, locator), and so forth. The one or more of applications 204 may display various graphical user interfaces (GUIs) to present information to and/or receive information from one or more users of the user devices 202. In various embodiments, the one or more applications 204 may include one or more applications configured to conduct some or all of the functionalities and/or processes discussed below.

In various examples, the one or more applications 204 may be utilized to interface and interact with an application on a remote server or system, such as a service provider application 208 of service provider device 206, through one or more networks such as a proprietary network 210A and/or one or more other networks 210B. The proprietary network 210A and/or the one or more other networks 210B may be the Internet, a WAN, a WWAN, a WLAN, a mobile telephone network, a landline telephone network, personal area network, as well as other suitable networks and/or combination of several suitable networks. In some examples, the application 204 may cause the user device 202 to communicate with the service provider application 208 of the service provider device 206 using a particular communication protocol, such as hypertext transfer protocol (HTTP), wireless session protocol (WSP), hypertext transfer protocol 2, web socket, and/or other application level communication protocols. In some examples, the application 204 may cause the user device 202 to communicate with the service provider device 206 particularly through the proprietary network 210A. In some examples, the proprietary network 210A may be a carrier network that may be a proprietary network infrastructure belonging to a telecommunications server such as Verizon™, AT&T™, Sprint™, Claro™, Telcel™ and/or the like. In some examples, the proprietary network 210A may inject a header, such as a custom HTTP header into an HTTP request, to some and/or all communications that user devices 202 conduct over the proprietary network 210A. In some examples, the communications from the user device 202 to the service provider device 206 may be through the proprietary network 210A and then may be relayed through one or more of the other networks 210B, such as the Internet, before reaching the service provider device 206. In some examples, the proprietary network 210A may relay the communications directly to the service provider device 206 in cases where the service provider device 206 is directly connected to the proprietary network 210A.

In various embodiments, the carrier encryption system 200 may include, among other elements, a carrier device 212. In various implementations, the carrier device 212 may host applications associated with or provided by the service provider device 206. For example, the carrier device 212 may enable the service provider device 206 to provide the user devices 202 and/or the service provider device 206 with additional services and/or information, identifying information, some of which will be discussed in greater detail below. In some examples, the carrier device 212 may be the same entity that owns, controls, and/or manages the proprietary network 210A. In some examples, the carrier device 212 may manage the injection of headers into communications that are conducted over proprietary network 210A, such as a custom HTTP header. In some examples, the injected headers may serve as an identifier for the user devices 202. In various examples, identifier information in the headers may be linked, associated with, and/or serve as an identifier for user information associated with the user devices 202 (e.g. information about who is paying for or has signed up for access to the proprietary network 210A for one or more of the user devices 202). The carrier device 212 may also provide the user device 202 and/or the service provider device 206 with other information and/or services, such as email services and/or information, communication services and/or information, messaging services, and/or information, and/or other services provided by a carrier apparent to one of skill in the art in possession of the present disclosure. In some examples, the carrier device 212 may include one or more servers for aggregating user data, communication data, and/or other statistics and information. In various examples, the carrier device 212 may include one or more gateways and/or routers such as, for example, a Cisco™ Aggregation Services Router (ASR) that runs the StarOS™ operating system.

In various examples, the service provider device 206 may comprise one or more communication interfaces that enable communication with the service provider device 206 via the proprietary network 210A and/or the one or more other networks 210B. In some examples the service provider device 206 may comprises one or more servers and applications to provide various online services. In some examples, the service provider device 206 may comprises web servers, API servers, messaging servers, application servers and/or the like.

In some examples, the service provider device 206 may utilize the one or more servers to provide a web interface. In some examples, web interface may be a front end application that may facilitate interactions between a web browsing application on the user devices 202 and the service provider application 208.

In some examples, the service provider device 206 may operate, through one or more servers, the service provider application 208. The service provider application 208 may be a backend application that may be configured to conduct one or more of the operations for identifying and authenticating users of user devices 202. In some examples, the service provider application 208 may be configured to communicate with one or more applications, such as the application 204 of user devices 202, one or more applications of carrier device 212, the web interface, and/or other service provider applications.

The carrier encryption system 200 may include one or more databases 214 which may be part of, managed, accessed, and/or operated by one or more of the user devices 202, the carrier device 212, and/or the service provider device 206. In some examples, the user devices 202, the carrier device 212, and/or the service provider device 206 may have copies or maintain their own versions of one or more databases similar to the databases 214. In some examples, one or more of the databases within the databases 214 may be configured physically and/or by software to limit access to certain servers, systems, and/or devices. In some examples, the databases 214 may include, among other possible databases, an account database 216, a user information database 218, an identification database 220, and/or the like. Databases 214 generally may store and maintain various types of information and may comprise or be implemented by various types of computer storage devices (e.g., servers, memory) and/or database structures (e.g., relational, object-oriented, hierarchical, dimensional, network) in accordance with the described embodiments.

While the embodiment of FIG. 2 illustrates a carrier encryption system 200 deployed in a three-party operating environment with a certain split of operations by each system or device, it is to be understood that other suitable operating environments and/or architectures with other splits of operations may be used in accordance with the described embodiments.

Figure 3:
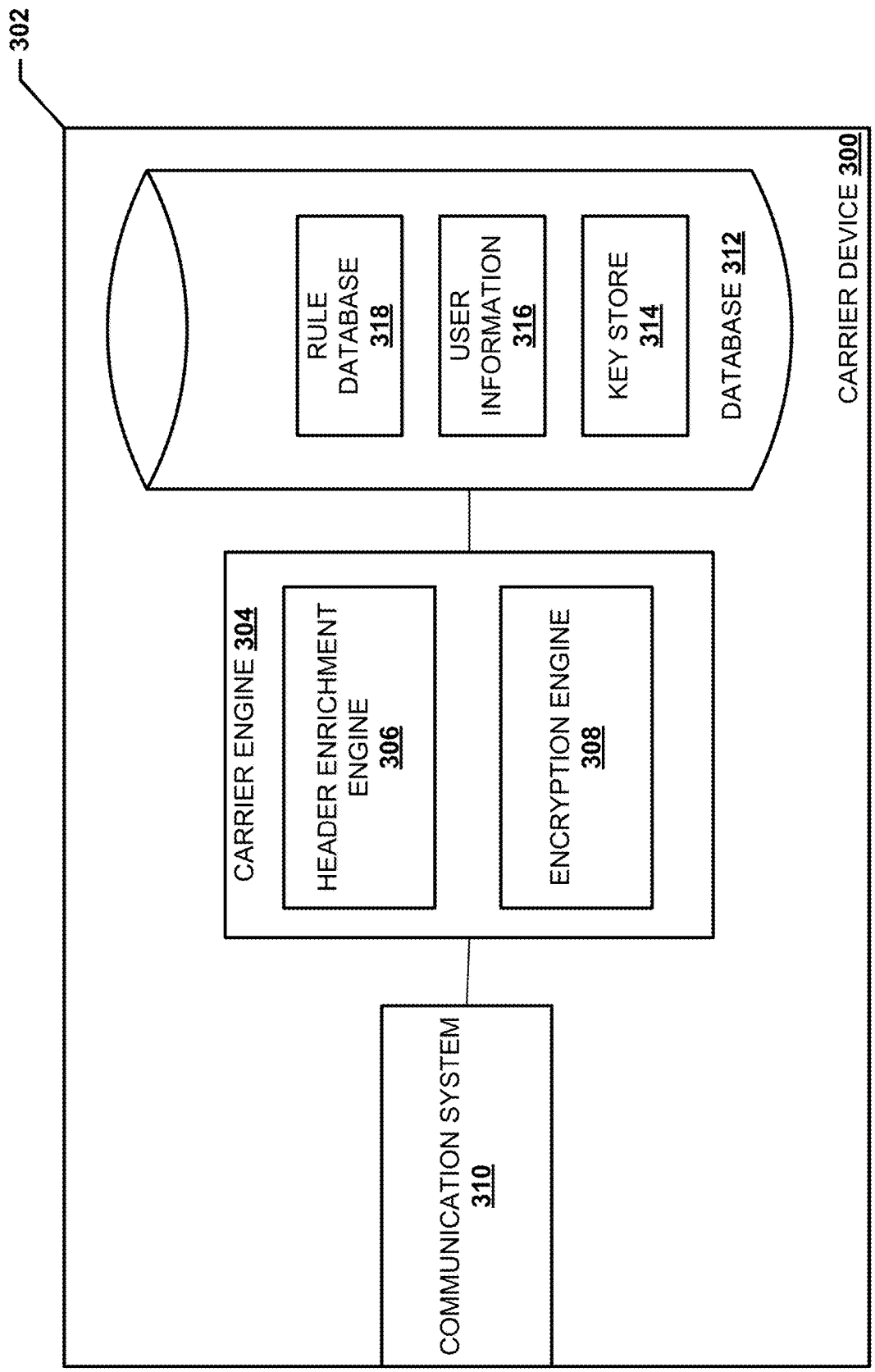
FIG. 3 is a schematic view illustrating an embodiment of a carrier device.

Referring now to FIG. 3, an embodiment of a carrier device 300 is illustrated that in some embodiments may be the carrier device 212 discussed above. As such, in some examples, the carrier device 300 may be provided by one or more server devices, one or more router devices, one or more switch devices, and/or one or more gateway devices. However, one of skill in the art in possession of the present disclosure will recognize that the carrier device 300 may be provided by any of a variety of computing device in the different examples discussed below.

In the illustrated embodiment, the carrier device 300 includes a chassis 302 that houses the components of the carrier device 300, only some of which are illustrated in FIG. 3. For example, the carrier device 300 may house a processing system (not illustrated) and a non-transitory memory system (not illustrated) that includes instructions that, when executed by the processing system, cause the processing system to provide a carrier engine 304 that is configured to perform the functions of the carrier engines and devices discussed below according to the method 100. For example, the carrier engine 304 may include a header enrichment engine 306 that is configured to intercept a request for information from a user device to a service provider device and inject a header into the request that may be used by the service provider to identify and authenticate a user of the user device that sent the request as detailed below. The carrier engine 304 may also include an encryption engine 308 that is configured to encrypt the request and/or the injected header as detailed below. The chassis 302 may also house a communication system 310 that is coupled to the carrier engine 304 (e.g., via a coupling between the communication system 310 and the processing system) and configured to provide for communication through the networks 210A and 210B as detailed below. In the illustrated embodiment, carrier device 300 also includes a storage device with a database 312 that provides a key store 314 that stores encryption keys, stores user information 316, which may include any of the information stored in the database 214, and stores header injection rules in a rule database 318 to be executed by the header enrichment engine 306. While the carrier device 300 is illustrated as including a chassis 302 that houses the database 312, one of skill in the art in possession of the present disclosure will recognize that the database 312 may be provided in a different device/chassis than the carrier device 300 such as, for example, a network attached storage device (e.g., the database 214 of FIG. 2), a non-network attached computing device (e.g., a "cold storage" device), and/or any other device or storage system known in the art.

Figure 4:
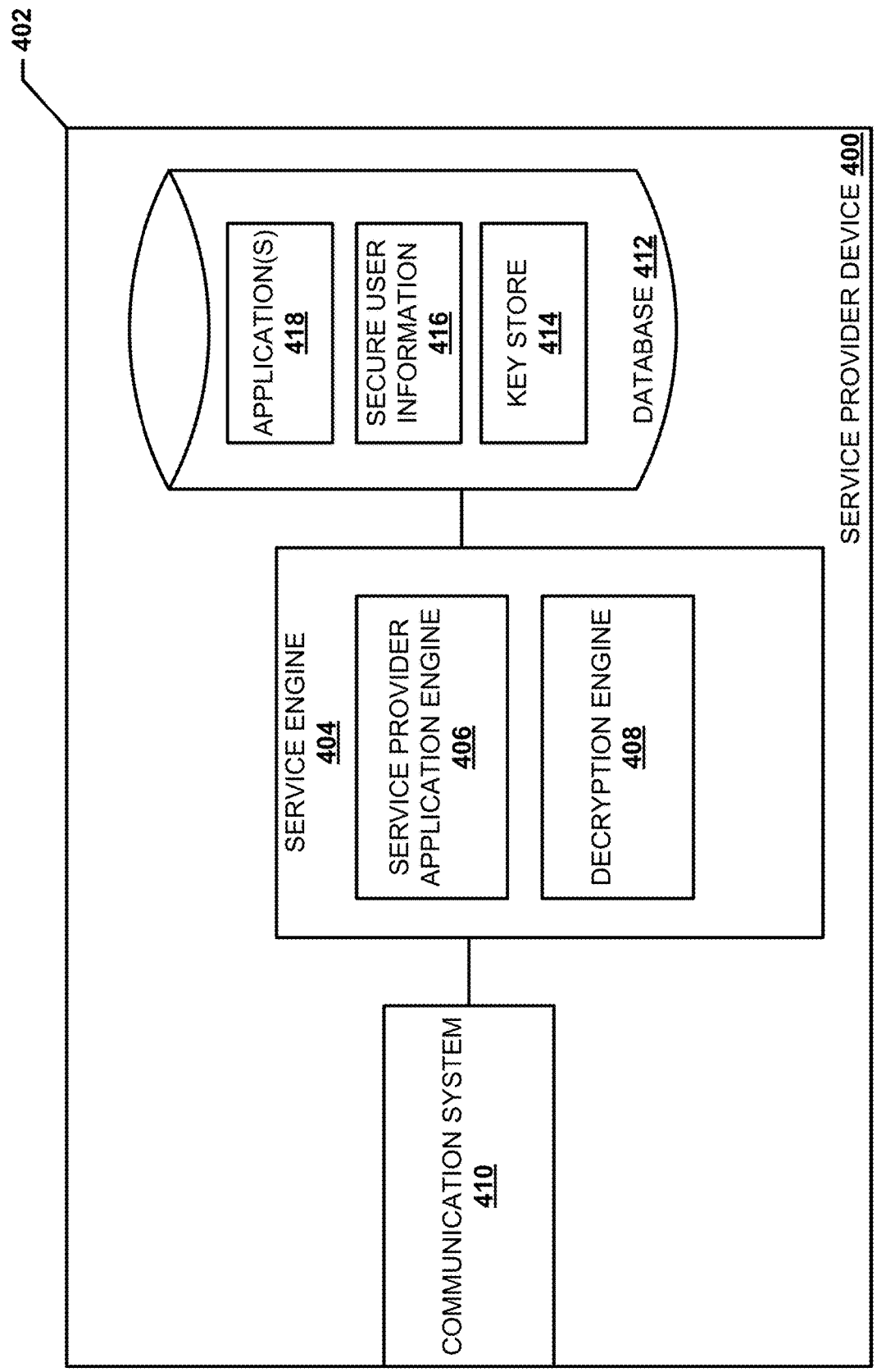
FIG. 4 is a schematic view illustrating an embodiment of a service provider device.

Referring now to FIG. 4, an embodiment of a service provider device 400 is illustrated that in some embodiments may be the service provider device 206 discussed above. As such, in some examples, the service provider device 400 may be provided by one or more server devices. However, one of skill in the art in possession of the present disclosure will recognize that the service provider device 400 may be provided by any of a variety of computing devices in the different examples discussed below.

In the illustrated embodiment, the service provider device 400 includes a chassis 402 that houses the components of the service provider device 400, only some of which are illustrated in FIG. 4. For example, the service provider device 400 may house a processing system (not illustrated) and a non-transitory memory system (not illustrated) that includes instructions that, when executed by the processing system, cause the processing system to provide a service engine 404 that is configured to perform the functions of the service engines and service provider devices discussed below according to the method 100. For example, the service engine 404 may include a service provider application engine 406 that is configured to provide services provided by the service provider (e.g., a payment processing application). The service engine 404 may also include a decryption engine 408 that is configured to decrypt any encrypted request as detailed below. The chassis 402 may also house a communication system 410 that is coupled to the service engine 404 (e.g., via a coupling between the communication system 410 and the processing system) and configured to provide for communication through the networks 210A and 210B as detailed below. In the illustrated embodiment, service provider device 400 also includes a storage device with a database 412 that provides a key store 414 that stores encryption keys, stores secure user information 416, which may include any of the information stored in the database 214, and stores at least one service provider application 418 to be executed by the service provider application engine 406. While the service provider device 400 is illustrated as including a chassis 402 that houses the database 412, one of skill in the art in possession of the present disclosure will recognize that the database 412 may be provided in a different device/chassis than the service provider device 400 such as, for example, a network attached storage device (e.g., the database 214 of FIG. 2), a non-network attached computing device (e.g., a "cold storage" device), and/or any other device or storage system known in the art.

Referring back to FIG. 1, the method 100 begins at block 102 where at least one encryption key is provided to a carrier device. In an embodiment, at block 102, the service provider device 206 may provide to a carrier device 212 in a carrier network (e.g., the proprietary network 210A) one or more encryption keys. For example, the service provider device 206 may generate a service provider public key and a service provider private key and provide the service provider public key to the carrier device 212 over the proprietary network 210A such as a mobile carrier network and/or the one or more other networks 210B. The carrier device 212 may store the service provider public key in the key store 314 of the database 312, while the service provider device 206 stores the service provider private key in the key store 414 of the database 412. Similarly, the carrier device 212 may generate a carrier private key and a carrier public key, and the carrier device 212 may provide the carrier public key to the service provider device 206 over the proprietary network 210A and/or the one or more other networks 210B. The carrier device 212 may store the carrier private key in the key store 314, while the service provider device 206 may store the carrier public key in the key store 414. The carrier device 212 and the service provider device 206 may include one or more key generation algorithms (e.g., a random number generator, a pseudo random number generator, and other key generators known in the art) that generate the carrier public/private keys and the system provider public/private keys. While the example discusses providing a service provider public key to the carrier device 212, one of skill in the art will recognize that a wide variety of encryption techniques may be used in the present disclosure such as providing a private key to the carrier device 212 without departing from the scope of the present disclosure.

The method 100 may then proceed to block 104, where an encrypted first request is received. In an embodiment at block 104, the service provider system 206 may receive an encrypted first request. The service provider system 206 may receive the encrypted first request over the proprietary network 210A and/or the one or more other networks 210B. Prior to receiving the encrypted first request, the application 204 on the user device 202 may generate and provide a first request over the proprietary network 210A and/or the one or more other networks 210B to the service provider device 206. In various examples, the first request may be a hypertext transfer protocol (HTTP) request packet (e.g., an HTTP POST or GET request packet), and/or any other request using other communication protocols apparent to one of skill in the art in possession of the present disclosure generated by the application 204.

In an example, the first request may request secure information that requires user authentication before the secure information is provided in a response back to the user device such as, for example, account information, balance information, user contact information, and other sensitive information apparent to one of skill in the art in possession of the present disclosure. In other examples, the application 204 may provide an account creation request, an account access request, a forgotten password request, and/or another request for access to a user account that requires an input of data (e.g., an HTTP POST request) from the user device such as user credentials to authenticate the user. In some examples, the user device 202 may send the request to sign up for an account with the service provider application engine 406, such as a social media website or an online payment application, through the proprietary network 210A. In some examples, the user device 202 may send the request using a native application on the user device 202 with an onboarding application component, such as one or more of applications 204 using the onboarding application component. In some examples, the user device 202 may send the request by using a webpage through a web browser application. For example, the application 204 of FIG. 2 may be a web application, and the user may navigate to a web page or address associated with an account signup page, such as a web interface. In some examples, the first request may be handled by a webpage, web application, or web interface, such that the user device 202 interacts with the service provider application engine 406 through the proprietary network 210A and/or one or more other networks 210B.

In various embodiments, when the user device 202 sends the first request or other form of communication to the service provider device 206 over the proprietary network 210A, the proprietary network 210A may detect that the first request is destined for the service provider system 206. For example, the carrier device 212 may receive the first request and determine, based on service provider identifying information included in the first request (e.g., a destination address (e.g., a URL, an IP address, and the like), a type of request, the source of the first request, and/or other service provider identifiers included in the request), that the carrier device 212 includes a rule stored in the rule database 318 to encrypt the first request. The carrier device 212 may encrypt the first request with one or more encryption keys stored in the key store 314 that are associated with the rule. The encryption key(s) may be selected based on the service provider associated with the destination of the first request. For example, the encryption engine 308 may sign the first request with the carrier private key and encrypt the signed first request with the service provider public key that is stored in the key store 314 if that service provider associated with the service provider key is identified as the destination of the first request.

In another example, the encryption engine 308 may encrypt the first request with the carrier private key and then encrypt the carrier private key with the service provider public key and provide the encrypted carrier private key with the encrypted first request. While examples of specific encryption schemes are described, the encryption engine 308 of the carrier device 212 may be configured to encrypt the first request according to any encryption algorithm that utilizes various encryption schemes such as Advanced Encryption Standard (AES), Digital Encryption Standard (DES), International Data Encryption Algorithm (IDEA), Rivest-Sharmir-Adleman (RSA), Diffie-Hellman, Digital Signature Algorithm (DSA), and/or other encryption algorithms apparent to one of skill in the art in possession of the present disclosure to provide the encrypted first request. The carrier device 212 may then provide the encrypted first request over the proprietary network 210A and/or the one or more other networks 210B to the service provider device 206.

In another example, the carrier device 212 may receive the first request and determine, based on the information included in the first request, that the carrier device 212 includes a rule stored in the rule database 318 to cause the header enrichment engine 306 of the carrier device 212 to inject a header into the communications and/or the first request prior to the encryption of the first request. In some examples, the communications conducted between the user device 202, application 204, and the service provider device 206 may be conducted using HTTP, and the injected header may be an HTTP header. In some examples, this feature may be conducted through header enrichment. The injected header may include information such as an identifier of the proprietary network 210A, an identifier for the user or user device, network subscription type (e.g. a monthly subscription, a prepaid plan, a corporate plan, a family plan, a data plan, a text or SMS plans, and/or the like), and/or other information about the user, the service provider, the carrier, the user device and/or the like. Some of the other information may be a GPS location, whether the device is stolen, how old the device is, how long the device or user associated with the proprietary network 210A, IP addresses, MAC addresses, and/or other information. In some examples, some of the other information may come from the user device 202 as part of the first request. Additionally, the user device 202 may provide information about the user device, such as its location, usage, battery life, serial number, phone number, carrier information, whether the device has a SIM card, how many times the device has changed SIM cards, whether the device is locked, where the device originated or was manufactured, and/or the like. In some examples, some of this information may be collected and provided by the carrier device 212 through header injection. The header of the first request may also include information about the application 204 being used that generated the first request.

Figure 5:
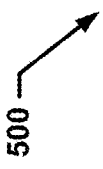
FIG. 5 is a block of code illustrating an example of an encrypted request encrypted by a carrier device.

In various examples, the injected header or a portion of the injected header may be encrypted by the encryption engine 308. Referring to FIG. 5, an example of the encrypted first request 500 that includes an encrypted injected header is illustrated. The encrypted first request may be an HTTP POST request that may be used to authenticate a user of the user device 202. The carrier device 212 may intercept the first request provided by the user device 202 and inject carrier information such as the user's phone number into the header of the first request. By providing the user device's 202 phone number to the service provider device 206, the service provider device 206 may use that phone number to verify the user and that the user is in possession of the user device 202. Thus, as illustrated in FIG. 5, the encrypted first request 500 may include an encrypted MSISDN 502 that is injected into the injected header 504. The injected header 504 may also include other information that is not encrypted such as a carrier identifier 506, a location identifier 508, and a customer name 510.

The method 100 then proceeds to block 106 where one or more encryption keys are determined to decrypt the encrypted first request. In an embodiment at block 106, the service engine 404 of the service provider device 206 may determine which encryption keys stored in the key store 414 to provide to the encryption engine 308 to decrypt the encrypted first request. The service engine 404 may determine the identity of the carrier of the proprietary network 210A to retrieve encryption keys that are associated with that carrier. In some examples, the carrier may be determined based on the format of the injected header (order in which information is provided, size of the header, the format of a particular data entry in the header, etc.). In some examples, a portion of the encrypted first request is not encrypted and the carrier device 212 may provide an identifier for the carrier in the encrypted first request. For example, the injected header may include the carrier identifier 506, as illustrated in FIG. 5. In various examples, the carrier and the respective encryption keys may be determined by the customer identifier such as the customer name 510 in FIG. 5, while in other examples, the carrier provided user identifier may be the MS-ISDN, if that user identifier is not encrypted. In various examples, the carrier may be determined based on user device information received. For example, a user device 202 may have provided an identifier, such as a name or code, associated with the carrier the user device 202 is subscribed to.

In various examples, the user device 202 may also provide a phone number, and the phone number can be used to determine the proprietor. In various examples, the wireless bands and/or frequencies used by the user device 202 for network communications may be provided, and the service engine 404 may determine the carrier based on the band and/or frequency used. This is possible because some carrier networks have assigned frequencies and/or bands.

If a carrier cannot be determined, at block 106, from the encrypted first request, then the service provider device 206 may return an error response to the user device 202. However, if the carrier that provided the encrypted first request can be identified, then the service engine 404 may retrieve the one or more encryption keys that are associated with carrier from the key store 414 and provide those keys to the decryption engine 408. The method 100 may then proceed to block 108 where the encrypted first message is decrypted to provide the first message. The decryption engine 408 of the service provider device 400 may decrypt the encrypted first message with the encryptions keys retrieved from the key store 414 in block 106. The decryption engine 408 may decrypt the encrypted first request according to the encryption algorithm that was used to encrypt the first request by the carrier device 212. The decryption of the encrypted first request by the decryption engine 408 provides the first request. For example, the decryption engine 408 may use the service provider private key to decrypt the encryption first request that was encrypted by the encryption engine 308 of the carrier device 212 using the service provider public key. The decryption engine 408 may then use the carrier public key to verify that the carrier signed the first request with the carrier private key. Verifying that the encrypted first request was encrypted by the carrier provides a high confidence level that the encrypted information (e.g., a user device identifier such as an MSISDN) included in the first request is valid.

The method 100 may then proceed to block 110 where it is determined whether the first request is consistent with an expected request. The service provider application engine 406, service engine 404, and/or the decryption engine 408 may be configured to determine whether the first request is consistent to an expected request. For example, the expected first request received from the user device 202 and/or the carrier device 212 may have a standard format that may include a specific layout of the data within the expected first request. For example, the injected header may include a specific number of fields, a specific order of the fields, specific types of fields, and/or other attributes that are consistent with an expected request for that request type from the carrier device 212, the user device 202, and/or application 204. The first request may be consistent or substantially similar with the expected request when the first request satisfies a predetermined threshold of similarity such as being 100% identical to the expected request, 99% identical, 95% identical, 80% identical, 75% identical, and/or any other predetermined threshold apparent to one of skill in the art in possession of the present disclosure to make a determination as to whether the first request is valid or whether the first request was malformed and/or otherwise provided by a user device to spoof the first request and the carrier encryption. If the consistency between the first request and the expected request is not satisfied, then the method 100 may proceed to block 112 where an error response may be returned to the user device 202.

However, if the consistency between the first request and the expected request is satisfied, then the method 100 may proceed to block 114 where the first request is processed. In an embodiment at block 114, the first request may be processed by a service provider application 418 being executed by the service provider application engine 406. For example, if the first request was for information, the service provider application 418 may retrieve the requested information from the secure user information 416 and provide that information in a response to the user device 202 according to block 116 of method 100.

Referring to FIG. 6, an example of a response 600 to the encrypted first request 500 of FIG. 5 is illustrated. As illustrated, the service provider application 418 may POST a decrypted MSISDN 602 that may include the country code and the national number of the user device 202. Because the MSISDN 602 was decrypted using encryption keys associated with the carrier (e.g., a carrier public key verifying a signature provided by the carrier private key), then the MSISDN retrieved from the first request is the MSISDN associated with the user device that provided the first request and the user associated with that user device. Therefore, the service provider application 418 may access the user account of the service provider application that is associated with the user associated with the MSISDN with a high confidence level and provide any requested information to that user device 202 without the user having to provide any manual input of credentials to access that information.

Figure 7:
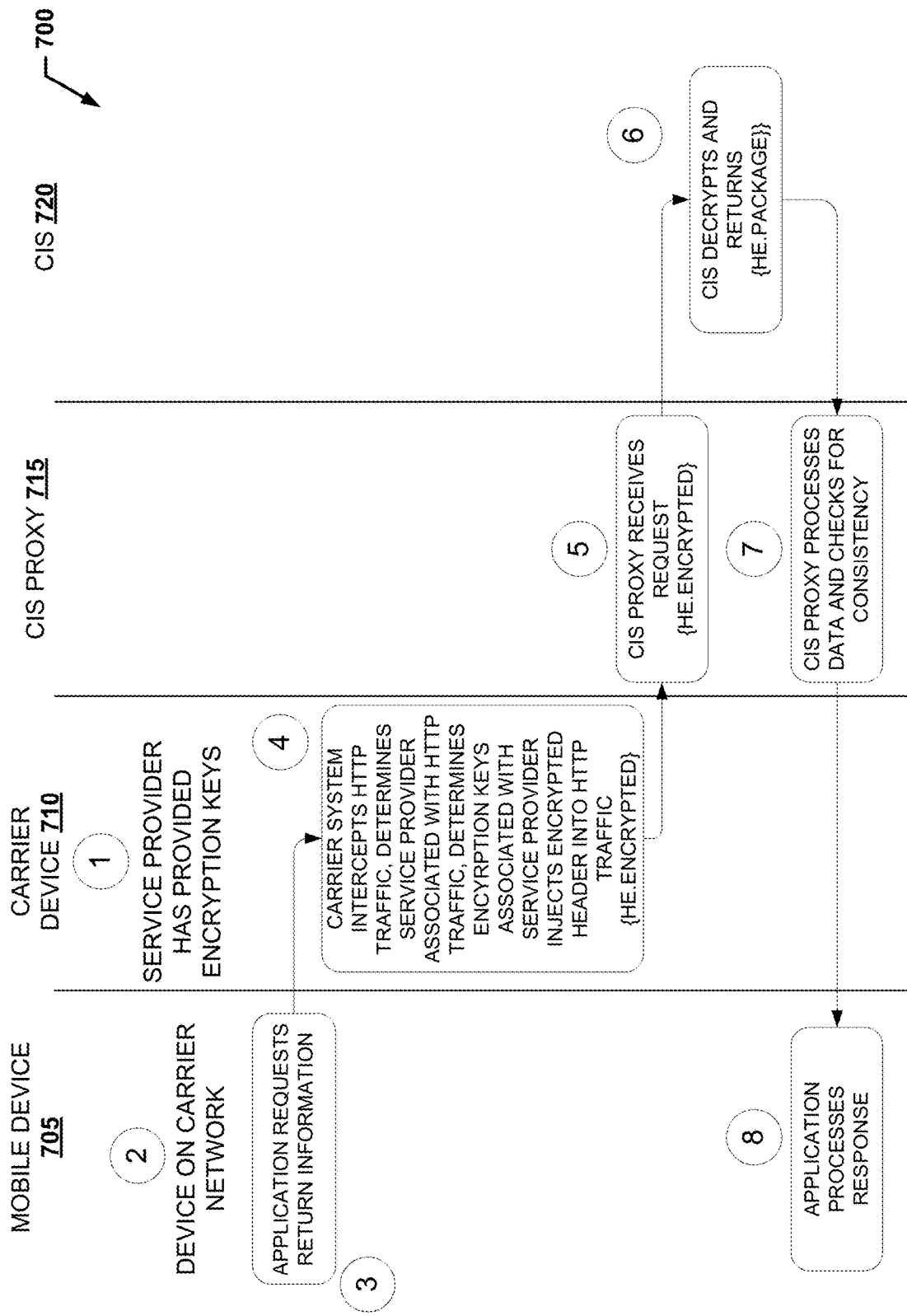
FIG. 7 is a flow diagram illustrating an example data flow of the method of FIG. 1.

Referring to FIG. 7, a flow diagram of a carrier encryption system 700 performing a specific example of method 100 is illustrated. The carrier encryption system 700 of FIG. 7 includes a mobile device 705, a carrier router 710, and a consumer information server (CIS) 720 corresponding generally with the user device 202, the carrier device 212, and the service provider device 206, respectively, discussed in reference to the carrier encryption system 200 of FIG. 2. Moreover, a consumer information server (CIS) proxy 715 may be provided by one or more of the features, processes, and/or applications of the service provider device 206 in reference to the carrier encryption system 200 of FIG. 2.

At step 1, the CIS 720 or other device included on a service provider system may exchange encryption keys with the carrier router 710. The mobile device 705 may be communicating HTTP traffic over the carrier network, at step 2. At step 3, an application on the mobile device 705 may provide an HTTP request that is destined for the CIS 720. At step 4, the carrier router 710 may intercept the HTTP request that is destined to the CIS 720 based on a service provider identifier in the HTTP request, the carrier router 710 may determine the service provider associated with the service provider identifier, determine the encryption key(s) that are associated with the service provider that were provided at step 1, generate a header to inject into the HTTP request, encrypt at least a portion of that header, inject an encrypted header into the HTTP request to provide an encrypted HTTP request, and transmit that encrypted HTTP request to the CIS proxy 715. The encrypted header may include an encrypted user identifier. At step 5, the CIS proxy 715 receives the request with the encrypted injected header and determines that the request is encrypted. At step 6, The CIS proxy 715 forwards the request to the CIS 720 that then decrypts the request with the encryption keys exchanged at step 1. The CIS 720 returns the decrypted request back to the CIS proxy 715 that processes the request and checks to make sure the request is consistent with what an expected request should be, at step 7. The CIS proxy 715 may use the user identifier decrypted from the encrypted header to access a customer account and provide customer information and form a secure communication session with the mobile device 705. At step 8, the mobile device 705 receives any requested information provided from the CIS proxy 715 via the secure communication session. The requested information may be used by the application on the mobile device 705 to perform an action.

In various embodiments, the carrier device 212 may provide to the service provider device 206 user information including information about the user device 202 when that user device 202 is associated with or otherwise joins the proprietary network 210*a* controlled by the carrier of the carrier device 212. The carrier device 212 may encrypt a notification according to any of the techniques described above that the user has joined the carrier network 210a which may include an identifier of the user device. The service provider device 206 may then decrypt the notification that the user device 202 is incorporated into the proprietary network 210a and thus have a record of the user device 202, the user device identifier, and any user information before the user of the user device 202 creates an account at the service provider device 206. Thus, a subsequent request to create an account at the service provider device 206 by the user device 202 may cause the service provider device 206 to use the user information previously received from the carrier device 212 in verifying that the user information that is provided in the encrypted request is not being manipulated or otherwise spoofed.

In another embodiment, the carrier device 212 has a service provider key such that when the carrier device 212 receives traffic destined to a service provider, the carrier device 212 encrypts the traffic that the service provider device can decrypt and confirm the accuracy of the request as discussed above. However, the service provider may receive traffic that is a request for the service provider device to interact with a second service provider device (e.g., a request to a merchant system to use a payment service provider to complete a transaction). The service provider device may include an encryption key that can be decrypted by the second service provider and use that encryption key to encrypt the request provided by the carrier device and provide the encrypted request to the second service provider device over the one or more other networks 210b. Thus, the second service provider device may receive the information that may have been injected into the request by the carrier device 212 with an added layer of security that the request has not been spoofed. The second service provider device may process the request using any information provided in the request from the carrier network and/or the first service provider.

Thus, a system and a method have been described that provide for carrier encryption of a request provided to a service provider device from a user device. The carrier encryption may be performed by a carrier encryption device that may be configured to intercept a request based on a service provider identifier and inject an encrypted header into the request to provide an encrypted request. The injected header may include information about the user device and/or user providing the request without the user and/or user device providing that information. After the service provider receives and decrypts the encrypted request with the injected header, the service provider device may use the information included in the request to authenticate the user providing the request as well provide for a secure communication session with the user device. The service provider device may provide any requested information back to the user device. Thus, the carrier encryption system provides a more secure system that provides secure information between user devices and service provider devices without manually providing user credentials as is done in traditional systems and further securing any systems that provide access to secure information based on carrier injected headers as discussed above.

Figure 8:
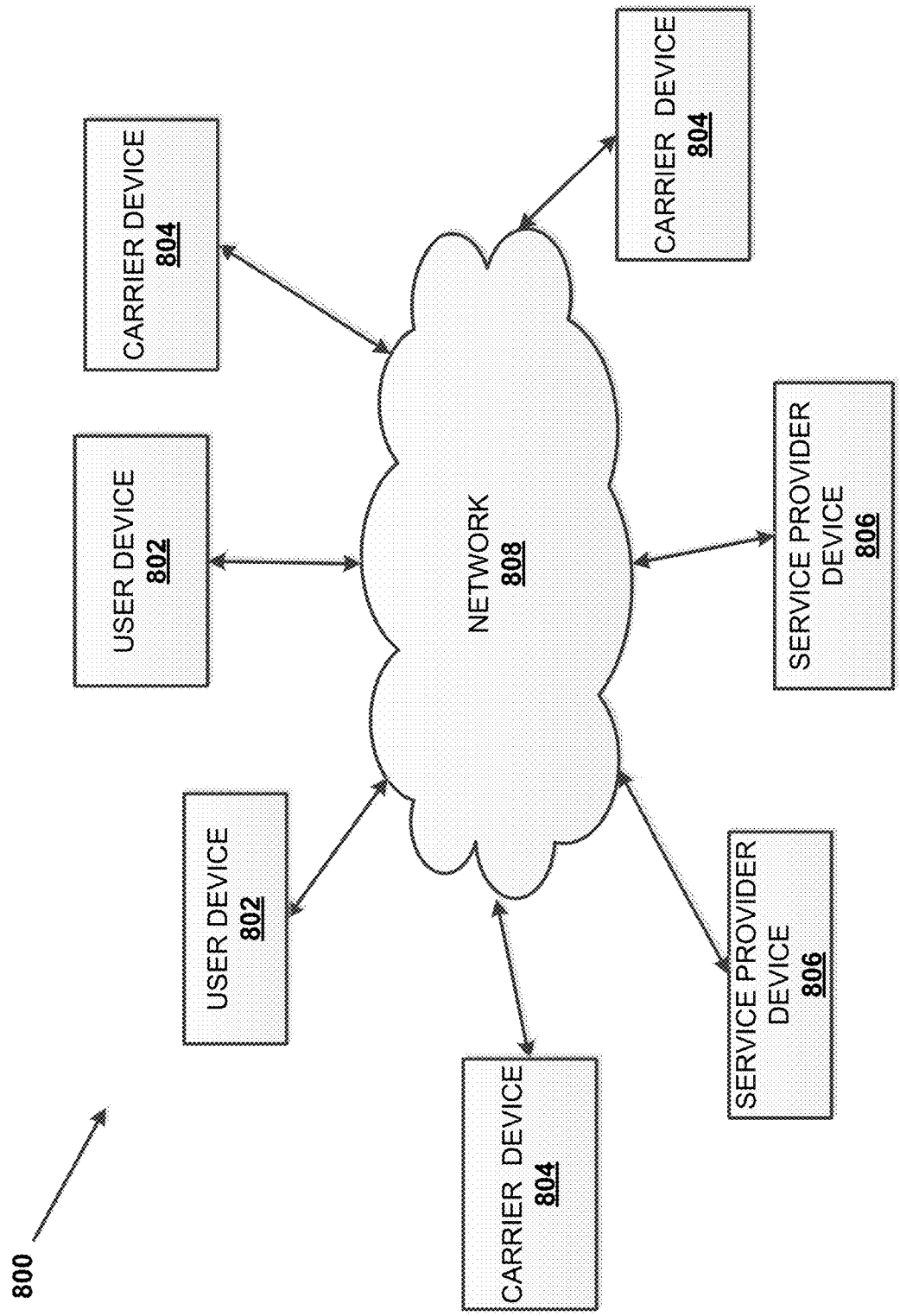
FIG. 8 is a schematic view illustrating an embodiment of a networked system.

Referring now to FIG. 8, an embodiment of a networked system 800 used in the carrier encryption system 200 described above is illustrated. The networked system 800 includes a plurality of user devices 802, a plurality of carrier devices 804, and a plurality of service provider devices 806 in communication over a network 808. Any of the user devices 802 may be the user devices operated by the users, discussed above. Any of the carrier devices 804 may be carrier devices discussed above. Any of the service provider devices 806 may be the service provider devices operated by the system providers, discussed above.

The user devices 802, carrier devices 804, and/or service provider devices 806 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the networked system 800, and/or accessible over the network 808.

The network 808 may be implemented as a single network or a combination of multiple networks. For example, in various embodiments, the network 808 may include the Internet and/or one or more intranets, landline networks, wireless networks, and/or other appropriate types of networks.

The user devices 802 may be implemented using any appropriate combination of hardware and/or software configured for wired and/or wireless communication over network 808. For example, in one embodiment, the user devices 802 may be implemented as a personal computer of a user in communication with the Internet. In other embodiments, the user devices 802 may be a smart phone, wearable computing device, laptop computer, and/or other types of computing devices.

The user devices 802 may include one or more browser applications which may be used, for example, to provide a convenient interface to permit the user to browse information available over the network 808. For example, in one embodiment, the browser application may be implemented as a web browser configured to view information available over the Internet.

The user devices 802 may also include one or more toolbar applications which may be used, for example, to provide user-side processing for performing desired tasks in response to operations selected by the user. In one embodiment, the toolbar application may display a user interface in connection with the browser application.

The user devices 802 may further include other applications as may be desired in particular embodiments to provide desired features to the user devices 802. In particular, the other applications may include a payment application for payments assisted by a payment service provider. The other applications may also include security applications for implementing user-side security features, programmatic user applications for interfacing with appropriate application programming interfaces (APIs) over the network 808, or other types of applications. Email and/or text applications may also be included, which allow the user to send and receive emails and/or text messages through the network 808. The user devices 802 include one or more user and/or device identifiers which may be implemented, for example, as operating system registry entries, cookies associated with the browser application, identifiers associated with hardware of the user devices 802, or other appropriate identifiers, such as a phone number. In one embodiment, the user identifier may be used to associate the user with a particular account as further described herein.

Figure 9:
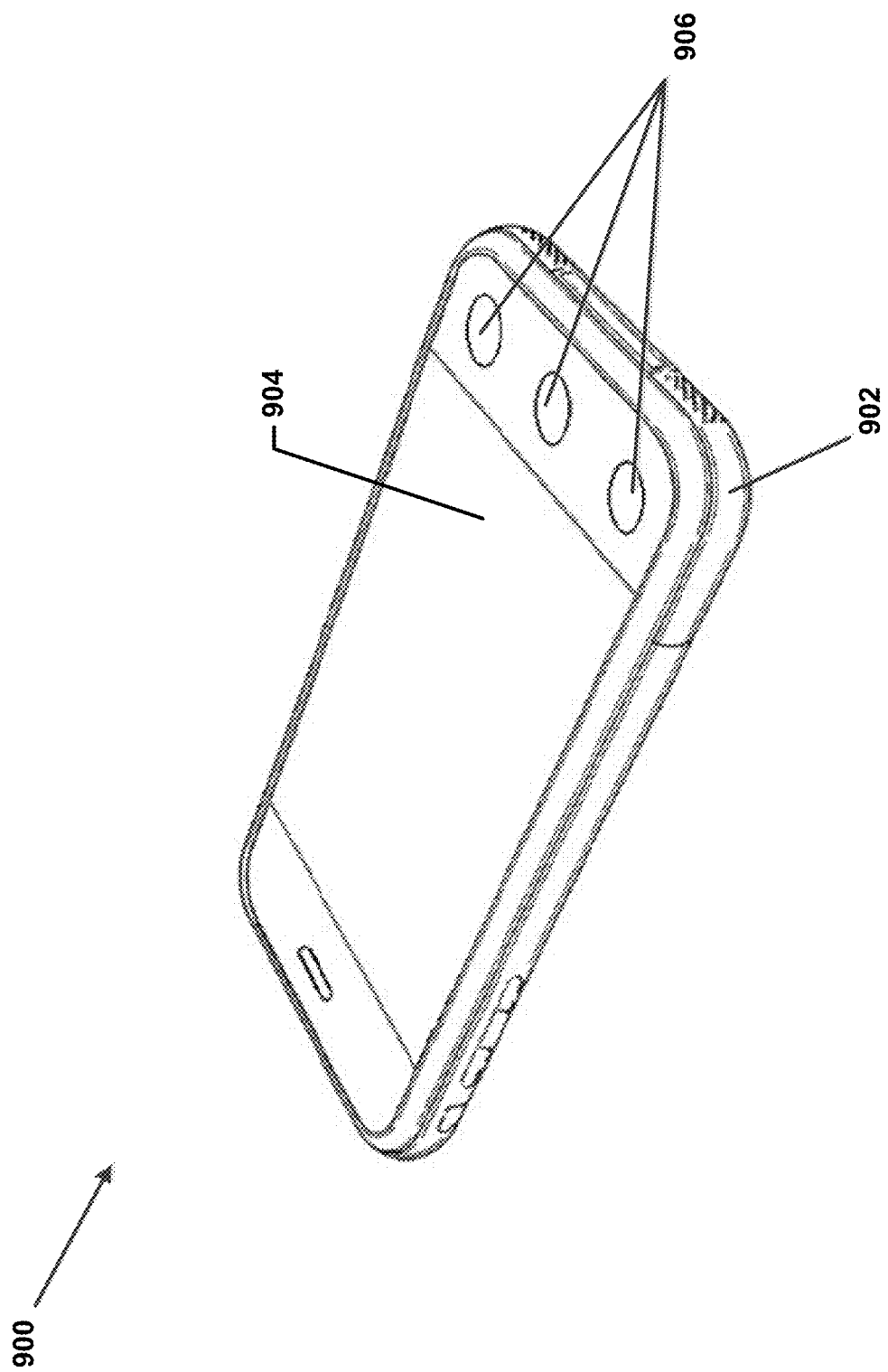
FIG. 9 is a perspective view illustrating an embodiment of a user device.

Referring now to FIG. 9, an embodiment of a device 900 is illustrated. The device 900 may be any of the user devices discussed above. The device 900 includes a chassis 902 having a display 904 and an input device including the display 904 and a plurality of input buttons 906. One of skill in the art will recognize that the device 900 is a portable or mobile phone including a touch screen input device and a plurality of input buttons that allow the functionality discussed above with reference to the method 100. However, a variety of other portable/mobile devices and/or desktop devices may be used in the method 100 without departing from the scope of the present disclosure.

Figure 10:
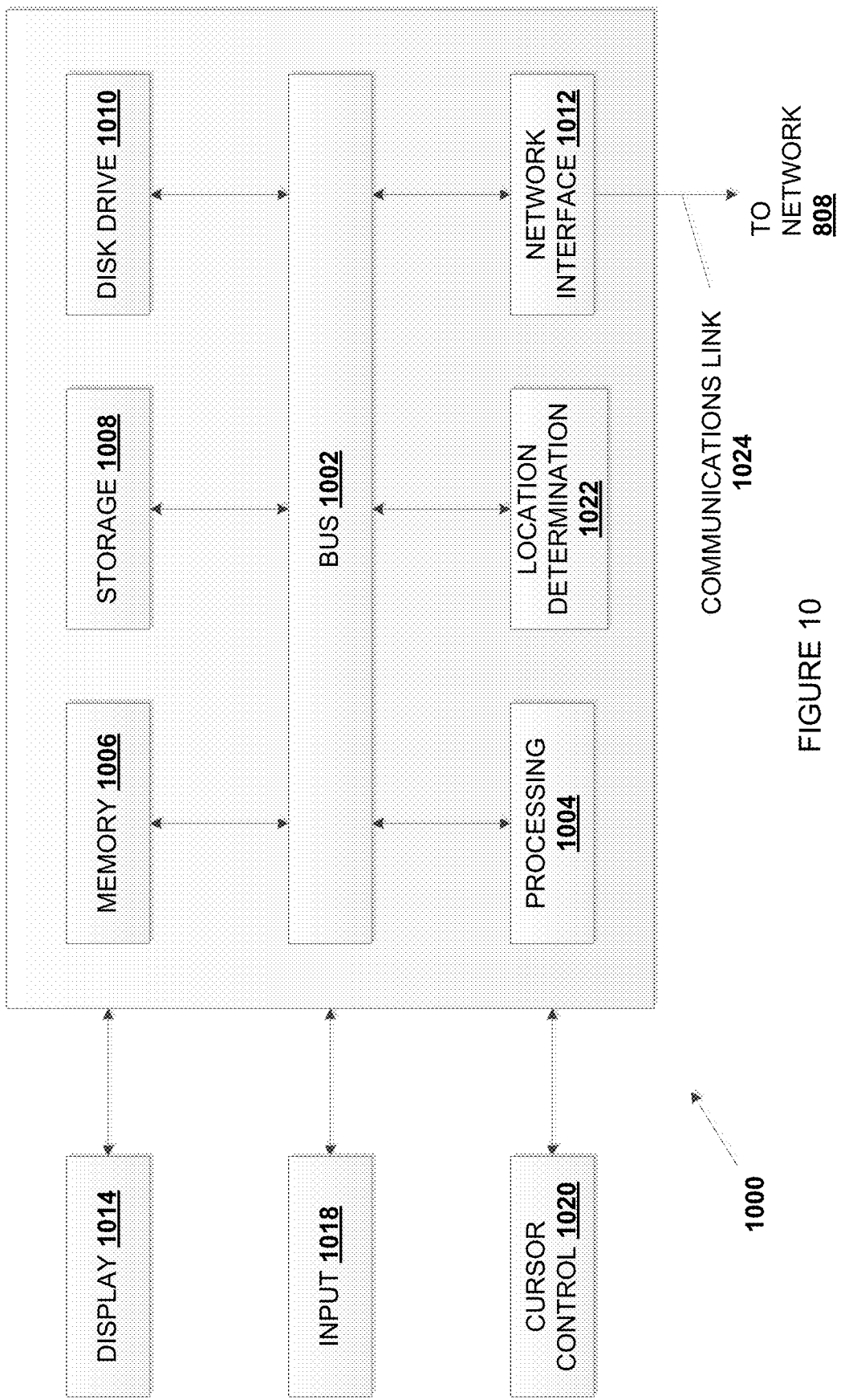
FIG. 10 is a schematic view illustrating an embodiment of a computer system.

Referring now to FIG. 10, an embodiment of a computer system 1000 suitable for implementing, for example, the user devices, distributed ledger devices, and/or system provider devices, is illustrated. It should be appreciated that other devices utilized in the distributed ledger authentication system discussed above may be implemented as the computer system 1000 in a manner as follows.

In accordance with various embodiments of the present disclosure, computer system 1000, such as a computer and/or a network server, includes a bus 1002 or other communication mechanism for communicating information, which interconnects subsystems and components, such as a processing component 1004 (e.g., processor, micro-controller, digital signal processor (DSP), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), a cursor control component 1020 (e.g., mouse, pointer, or trackball), and/or a location determination component 1022 (e.g., a Global Positioning System (GPS) device as illustrated, a cell tower triangulation device, and/or a variety of other location determination devices known in the art). In one implementation, the disk drive component 1010 may comprise a database having one or more disk drive components.

In accordance with embodiments of the present disclosure, the computer system 1000 performs specific operations by the processor 1004 executing one or more sequences of instructions contained in the memory component 1006, such as described herein with respect to the payer devices, payee devices, user devices, payment service provider devices, and/or system provider devices. Such instructions may be read into the system memory component 1006 from another computer readable medium, such as the static storage component 1008 or the disk drive component 1010. In other embodiments, hard-wired circuitry may be used in place of or in combination with software instructions to implement the present disclosure.

Logic may be encoded in a computer readable medium, which may refer to any medium that participates in providing instructions to the processor 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1010, volatile media includes dynamic memory, such as the system memory component 1006, and transmission media includes coaxial cables, copper wire, and fiber optics, including wires that comprise the bus 1002. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1000. In various other embodiments of the present disclosure, a plurality of the computer systems 1000 coupled by a communication link 1024 to the network 908 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1000 may transmit and receive messages, data, information and instructions, including one or more programs (i.e., application code) through the communication link 1024 and the network interface component 1012. The network interface component 1012 may include an antenna, either separate or integrated, to enable transmission and reception via the communication link 1024. Received program code may be executed by processor 1004 as received and/or stored in disk drive component 1010 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A carrier network system, comprising:
 one or more processors, one or more non-transitory computer-readable memories, with program instructions stored on the one or more non-transitory computer-readable memories, the one or more processors configured to execute the program instructions to cause the carrier network system to perform operations comprising:
    intercepting a first request transmitted by an application on a user device of a user to a service provider server associated with a service provider, wherein the intercepting is based on analyzing an identifier associated with the first request;
    in response to intercepting the first request, injecting header information into the first request based on analyzing information contained in the first request;
    determining an identity of the service provider based on at least one of the identifier or the information;
    determining, from a plurality of encryption keys associated with different service providers, one or more encryption keys corresponding to the identity of the service provider for encrypting the first request;
    utilizing the determined one or more encryption keys to encrypt the first request; and
    transmitting the encrypted first request to the service provider server to cause the service provider server to decrypt the encrypted first request using the one or more encryption keys and perform an action corresponding to the first request, wherein the action requires a user authorization prior to performing the action, and wherein the user authorization is processed using user device information associated with the user device and the header information in the first request that causes the user authorization to be satisfied.

2. The carrier network system of claim 1, wherein the header information includes the user device information.

3. The carrier network system of claim 1, wherein the user device information comprises at least one of a mobile station international subscriber directory number or a digital fingerprint of the user.

4. The carrier network system of claim 1, wherein the header information includes user information that identifies the user.

5. The system of claim 1, wherein the one or more encryption keys comprises a private key associated with the carrier network system and a public key associated with the service provider.

6. The carrier network system of claim 1, wherein unencrypted information contained in the header information enables the service provider server to utilize the one or more encryption keys to decrypt the encrypted first request.

7. The carrier network system of claim 1, the operations further comprising:
    prior to the determining the one or more encryption keys, receiving at least one of the one or more encryption keys from the service provider server.

8. A method comprising:
    intercepting, by a carrier network device within a carrier network, a first request transmitted by an application on a user device of a user to a service provider server associated with a service provider, wherein the intercepting is based on analyzing an identifier associated with the first request;
    injecting header information into the first request based on information contained in the first request;
    determining an identity of the service provider based on at least one of the identifier or the information;
    selecting, from a plurality of encryption keys associated with different service providers, one or more encryption keys for encrypting the first request based on the identity of the service provider;
    encrypting, by the carrier network device, the first request using the one or more encryption keys; and
    transmitting, by the carrier network device, the encrypted first request to the service provider server to cause the service provider server to decrypt the encrypted first request using the one or more encryption keys and perform an action corresponding to the first request, wherein the action requires a user authorization prior to performing the action, and wherein the user authorization is satisfied based on user device information associated with the user device and the header information in the first request.

9. The method of claim 8, wherein the header information includes the user device information.

10. The method of claim 8, wherein the user device information comprises at least one of a mobile station international subscriber directory number or a digital fingerprint of the user.

11. The method of claim 8, wherein the header information includes user information that identifies the user.

12. The method of claim 8, wherein the one or more encryption keys comprises a private key associated with the carrier network device and a public key associated with the service provider.

13. The method of claim 8, wherein unencrypted information contained in the header information enables the service provider server to utilize the one or more encryption keys to decrypt the encrypted first request.

14. The method of claim 8, further comprising:
    prior to the determining the one or more encryption keys, receiving at least one of the one or more encryption keys from the service provider server.

15. A non-transitory machine-readable medium having stored thereon machine-readable instructions executable to cause a machine to perform operations comprising:
    intercepting a first request transmitted by an application on a user device of a user to a service provider server associated with a service provider, wherein the intercepting is based on analyzing an identifier associated with the first request;
    injecting header information into the first request based on analyzing information contained in the first request;
    determining an identity of the service provider based on at least one of the identifier or the information;
    determining, from a plurality of encryption keys, one or more encryption keys for encrypting the first request based on the identity of the service provider;
    encrypting the first request using the one or more encryption keys; and
    transmitting the encrypted first request to the service provider server to cause the service provider server to decrypt the encrypted first request using the one or more encryption keys and perform an action corresponding to the first request, wherein the action requires a user authorization prior to performing the action, and wherein the user authorization is processed based on user device information associated with the user device and the header information.

16. The non-transitory machine-readable medium of claim 15, wherein the header information includes the user device information.

17. The non-transitory machine-readable medium of claim 15, wherein the user device information comprises at least one of a mobile station international subscriber directory number or information corresponding to a digital fingerprint of the user.

18. The non-transitory machine-readable medium of claim 15, wherein the header information includes user information that identifies the user.

19. The non-transitory machine-readable medium of claim 15, wherein the one or more encryption keys comprises a public key associated with the service provider.

20. The non-transitory machine-readable medium of claim 15, wherein unencrypted information contained in the header information enables the service provider server to utilize the one or more encryption keys to decrypt the encrypted first request.

\* \* \* \* \*